TWO BAND CONVERTER STAGE WITH SIGNAL GRID BIAS STABILIZING MEANS
Filed Sept. 10, 1952
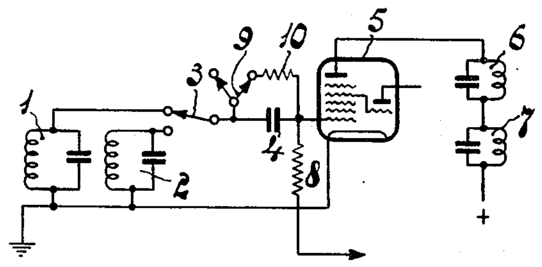
INVENTORS
WILLEM WIGGER BOELENS
DIRK WILLEM VAN DER SYDE
BY
AGENT United States Patent Office 2,784,308 Patented Mar. 5, 1957

2,784,308

TWO BAND CONVERTER STAGE WITH SIGNAL GRID BIAS STABILIZING MEANS

Willem Wigger Boelens and Dirk Willem van der Syde, Eindhoven, Netherlands, assignors to Hartford National Bank and Trust Company, Hartford, Conn., as trustee Application September 10, 1952, Serial No. 308,852

Claims priority, application Netherlands October 13, 1951

2 Claims. (Cl. 250—20)

The invention relates to a circuit arrangement for frequency transformation of high-frequency oscillations with the use of a mixer comprising not only a cathode and an anode but also a plurality of intermediate grids, the incoming oscillations to be transformed in frequency being fed to a first grid, preferably the interior grid, the locally produced oscillations being operative at another grid.

The invention has for its object to provide such an arrangement in which with the use of a wavelength switch, at will, a circuit for ultra high-frequency oscillations or a circuit for oscillations of a lower frequency range, for example, the broadcast range may be connected in the circuit of the first grid (input grid circuit), a very satisfactory mutual conductance being obtained in both cases.

With circuit-arrangements for frequency transformation use is preferably made of a so-called triode-heptode or a triode-hexode, the triode part of which is connected as an oscillator. The incoming oscillations to be transformed in frequency are fed to the first grid of the heptode part or the hexode part respectively, the local oscillations being operative at the third grid. This grid may be connected directly to the grid of the triode part. The second grid and the fourth grid of the heptode part serve, moreover, as screen grids and the fifth grid is a collecting grid, which is connected to the cathode. The anode circuit of the heptode part includes one or more circuits tuned to an intermediate frequency.

With such circuit-arrangements it is also common practice to feed a control-voltage for the automatic gain control to the first grid of the heptode part.

It has been found that with circuit-arrangements of the kind described above, owing to parasitic couplings between the oscillator grid and the input grid of the heptode part, at very high frequencies, for example, of the order of 100 mc./s., a comparative high voltage of oscillator frequency of, for example, 2 to 3 volts may occur at the input grid. If the high-frequency voltages are supplied, in conventional manner, via a grid capacitor to this grid and if, moreover, this grid is connected via a high grid leak resistor to the cathode or to a source of control-voltage, detection of the oscillator voltage occurs at the said grid with the said high frequencies. Thus the grid obtains such a high negative bias voltage that the conductance of mixer becomes very low.

During the reception of the said very high frequencies the coupling capacitor could be short-circuited, so that the input control-grid would be connected via the coil of the high-frequency input circuit to the cathode. However, it has been found that such an arrangement has a limitation in that in this case strong damping of the high-frequency input circuit occurs, since the latter is connected in parallel with the grid-cathode space of the mixer.

The invention provides a circuit-arrangement in which this limitation is obviated. It consists in that with a circuit-arrangement for frequency transformation of high-frequency oscillations with the use of a mixer comprising not only a cathode and an anode but also a plurality of intermediate grids, the incoming oscillations to be transformed in frequency being fed to a first grid, preferably, the interior grid, the locally produced oscillations being operative at another grid, provision being, moreover, made of a wavelength switch with the use of which, at will, a circuit for ultra high-frequency oscillations or a circuit for oscillations of a lower frequency range, for example, the broadcast range may be connected in the input grid circuit, not only the grid leak resistor and the grid capacitor, through which the circuits are connected to the first grid, but also a second resistor is provided which is connected in parallel with the grid capacitor by means of the switching-over device, if the circuit for ultra high-frequencies is connected. In this case the first grid is connected to earth via this resistor and the coil of the input circuit.

The value of the second resistor is preferably only a portion of that of the grid leak resistor. If, for example, the grid leak resistor is 0.5 to 1 megohm, the second resistor may be 50,000 to 100,000 ohms.

Although the invention is particularly intended to be carried out with circuit-arrangements in which a triode-heptode is used, it may also be used with mixing circuit-arrangements comprising mixers of another type.

In order that the invention may be readily carried into effect, it will now be described in detail with reference to the accompanying drawing.

Referring to the drawing, reference numeral 1 designates a high-frequency circuit which is tuned, for example, to a frequency of 100 mc./s. To this circuit are supplied, in a manner not shown, high-frequency oscillations which are, for example, modulated in frequency. Provision is furthermore made of the circuit 2, which is, for example, tunable to the oscillations in the broadcast range and which is coupled with a receiver aerial for the broadcast oscillations. By means of the switch 3 the circuit 1 or the circuit 2 may be connected, at will, between the grid and the cathode of the heptode part of the tube 5. In both cases a grid capacitor 4 is interconnected.

The tube 5 is shown as a triode-heptode. The triode part operates, in a manner not shown, as an oscillator. The oscillations of the oscillator are supplied to the third grid of the heptode portion of the tube 5, which thus operates as a mixing system. The anode circuit includes the circuits 6 and 7, which may be tuned to intermediate frequencies of 10.5 mc./s. and 452 kc./s.

Provision is made of a grid leak resistor 8, through which a direct voltage for automatic gain control is supplied to the first grid of the tube.

With the circuit-arrangement so far described difficulties arise in the reception of ultra high-frequency oscillations, consisting in that oscillations from the local oscillator are transmitted via the capacity between the third grid and the first grid of the heptode system to the first grid, where they are detected, so that this grid may have such a high negative bias voltage that the mutual conductance of the heptode system decreases considerably. Therefore, according to the invention, provision is made of the resistor 10, which is connected in parallel with the grid capacitor 4 by means of the switch 9 at the reception of ultra high-frequency oscillations. The switches 3 and 9 are mechanically coupled to one another.

The resistor 10 has a high value, which is a portion of the value of the grid leak resistor. The resistor 10 must not be too high, since otherwise the negative grid voltage produced by detection of the oscillator voltage would increase excessively. Moreover, this voltage acts, via the resistor 8, on the grids of preceding high-frequency amplifying tubes and of following intermediate-frequency tubes. With an excessively low value of the resistor 10 the amplification of the various tubes would be too low and the dampening of the circuit 1 will be too great.

What we claim is:

1. A circuit arrangement for frequency transformation of high-frequency oscillations, comprising an electronic mixing device having a cathode, an anode and a plurality of grids arranged serially between said cathode and anode, a source of bias voltage, a grid leak resistor connected between said source and a first one of said grids, said first grid being the grid nearest said cathode, a source of local oscillations connected to another of said grids which is relatively remote from said cathode, a first input circuit connected to receive a first range of high-frequency oscillations, a second input circuit connected to receive a second range of high-frequency oscillations, said second range being lower in frequency than said first range, a capacitor having one terminal thereof connected to said first grid, switching means for selectively connecting said first and second input circuits to the remaining terminal of said capacitor, a second resistor, and means for connecting said second resistor directly across said capacitor between said terminals thereof whenever said switching means connects said first input circuit to said remaining terminal of said capacitor.

2. A circuit arrangement as claimed in claim 1, in which said second resistor has a value of resistance which is less than the resistance of said grid leak resistor.

References Cited in the file of this patent

UNITED STATES PATENTS

| | | |
|---|---|---|
| 2,023,439 | Rechnitzer | Dec. 10, 1935 |
| 2,141,756 | Linsell | Dec. 27, 1938 |
| 2,235,576 | Eisele | Mar. 18, 1941 |
| 2,504,626 | Bell | Apr. 18, 1950 |
| 2,531,845 | Gall | Nov. 28, 1950 |
| 2,591,264 | Janssen | Apr. 1, 1952 |

FOREIGN PATENTS

| | | |
|---|---|---|
| 493,757 | Great Britain | Oct. 13, 1938 |

OTHER REFERENCES

"Frequency-Changing Problems," by Lukacs and Sargrove; The Wireless World, January 26, 1939, pages 81 and 82.